Jan. 13, 1925.  1,523,078
R. G. NELSON
FLUID BRAKE FOR MOTOR VEHICLES
Filed July 25, 1923  2 Sheets-Sheet 1

Inventor
Robert G. Nelson.
By
Lacey & Lacey, Attorneys

Jan. 13, 1925.  
R. G. NELSON  
1,523,078  
FLUID BRAKE FOR MOTOR VEHICLES  
Filed July 25, 1923  2 Sheets-Sheet 2

Inventor  
Robert G. Nelson.

By  
Lacey & Lacey, Attorneys

Patented Jan. 13, 1925.

1,523,078

UNITED STATES PATENT OFFICE.

ROBERT G. NELSON, OF BELT, MONTANA, ASSIGNOR OF ONE-HALF TO CLINTON L. CRANE, OF ARMINGTON, MONTANA.

FLUID BRAKE FOR MOTOR VEHICLES.

Application filed July 25, 1923. Serial No. 653,753.

*To all whom it may concern:*

Be it known that I, ROBERT G. NELSON, citizen of the United States, residing at Belt, in the county of Cascade and State of Montana, have invented certain new and useful Improvements in Fluid Brakes for Motor Vehicles, of which the following is a specification.

This invention relates to an improved fluid brake for motor vehicles and seeks, among other objects, to provide a brake which will operate through the medium of the propeller shaft of the vehicle for braking the vehicle.

The invention seeks, as a further object, to provide a brake wherein the braking effect obtained may be readily graduated and controlled.

And the invention seeks, as a still further object, to provide a brake which may be readily installed upon motor vehicles of different makes.

Other and incidental objects will appear hereinafter.

In the drawings:

Figure 4 is a transverse sectional view on the line 4—4 of Figure 1, looking in the direction of the arrows.

Figure 1:
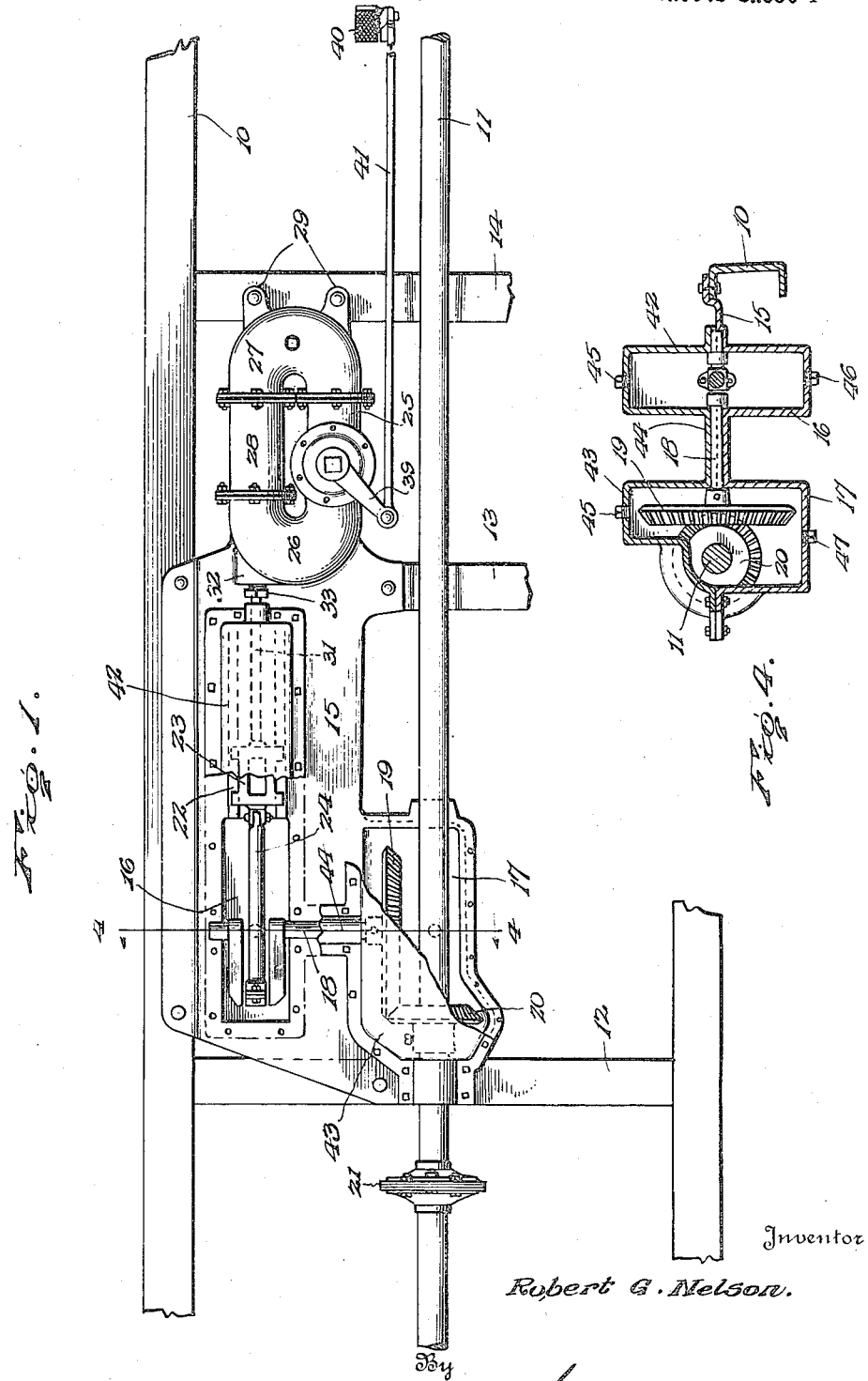
Figure 1 is a plan view showing my improved fluid brake in conjunction with the chassis frame and propeller shaft of a conventional motor vehicle.

Referring now more particularly to the drawings, I have shown my improved brake in connection with a conventional motor vehicle chassis and propeller shaft, the side bars of the chassis being indicated at 10 and the propeller shaft at 11. As brought out in Figure 1, I employ cross bars 12, 13 and 14 suitably secured at their ends to the side bars 10 and riveted or otherwise secured to the bars 12 and 13 as well as to the adjacent side bar of the chassis is a plate 15. This plate is provided with a crank case 16 as well as a gear case 17 lying beneath the shaft 11 and journaled in suitable bearings to extend across the crank case into the gear case is a crank shaft 18 to one end of which is fixed a beveled gear 19 accommodated by the gear case. Secured upon the propeller shaft 11 in front of the bar 12 to mesh with said gear is a pinion 20 and, preferably, a suitable universal joint 21 is interposed in the propeller shaft at the rear of said bar. Extending along the plate 15 forwardly from the crank case 16 are spaced parallel guides 22 between which is slidably mounted a cross head 23 and extending between said cross head and the crank pin of the shaft 18 is a connecting rod 24.

Mounted at the forward end of the plate 15 is an endless fluid conduit having parallel sides and companion ends of like curvature. The conduit is formed of sections including a side section 25 formed with an elbow 26 and detachably bolted to said section is a like elbow 27 provided at its upper side with a filler plug and at its lower side with a similar drain plug. Extending in parallel relation to the side section 25 is an opposite side section forming a cylinder 28 detachably bolted at its ends to the adjacent ends of the elbows 26 and 27. Thus, the conduit may be readily assembled and, as will now be observed, the elbow 26 may be integrally formed on the plate 15 while the elbow 27 is provided with spaced ears 29 riveted or otherwise secured to the cross bar 14. Slidable in the cylinder 28 is a piston 30 having a piston rod 31 connected to the cross head 23. Formed on the elbow 26 to receive the piston rod therethrough is a boss 32 and threaded into said boss is a gland 33 for the rod. Near one end thereof the side section 25 of the conduit is enlarged to provide a cylindrical vertically disposed valve casing 34 closed at its upper end by a removable cap plate 35 and rotatably fitting in said casing is a valve 36 having a passage 37 of a diameter equal to the diameter of the conduit. Upstanding from the valve is a stem 38 rotatably received through the cap plate 35 of the valve casing and provided with a squared upper terminal receiving a valve lever 39. Suitably mounted upon the vehicle convenient to the driver, is a foot pedal 40 and extending between the foot pedal and the lever 39 is a rod 41.

Fitting over the crank case 16 is a cover 42 extended, as shown in Figure 1, to house the guides 22, cross head 23 and rod 31, and fitting over the gear case 17 is a cover 43 housing the gears 19 and 20, the covers being connected by a bearing portion 44 overlying the shaft 18 between the crank case and gear case. The covers are bolted or otherwise detachably secured in position and carry filler plugs 45. At the lower side of the crank case is a similar drain plug 46 while the gear case is equipped with a like plug 47. Thus, the gear case as well as the crank case may be filled with oil for lubricating the parts housed therein. Furthermore, these parts will also be effectually protected from dust and dirt.

Figure 2:
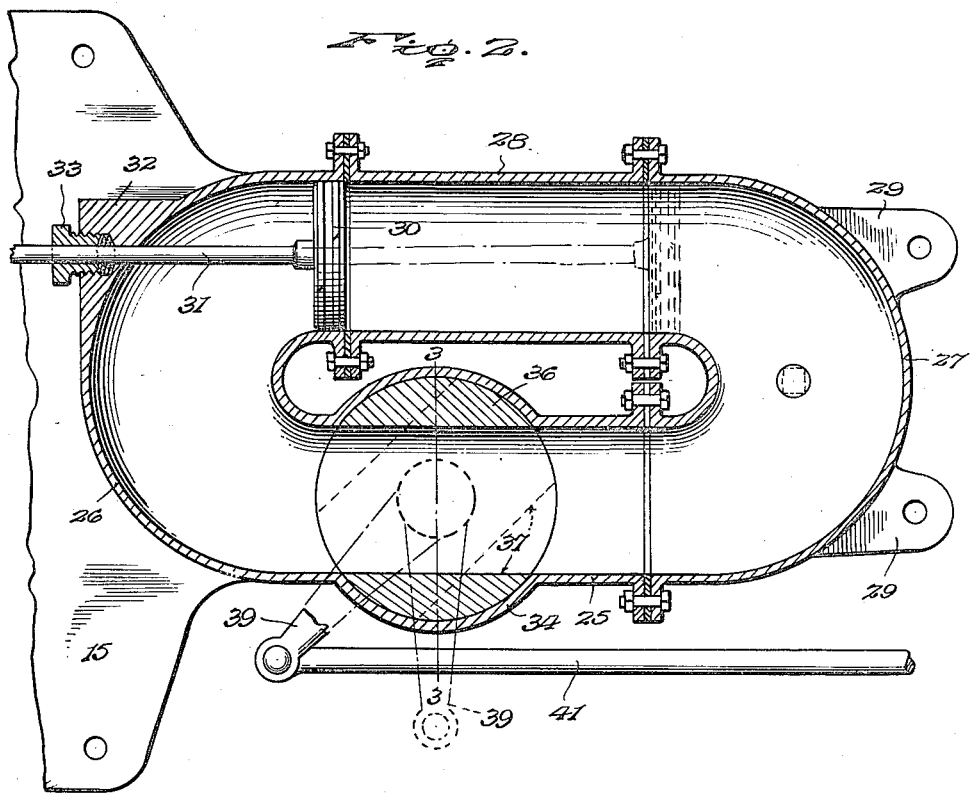
Figure 2 is a horizontal sectional view through the endless fluid conduit of the brake.
Figure 3:
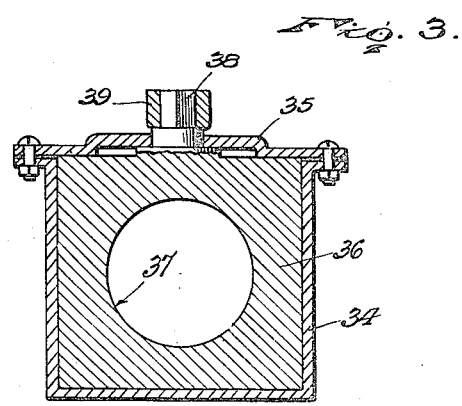
Figure 3 is a detail sectional view on the line 3—3 of Figure 2.

In use, the endless conduit is filled with a suitable fluid and, as will now be seen in view of the preceding description, when the vehicle is in motion, the crank shaft 18 will be rotated by the propeller shaft 11 for driving the piston 30 back and forth in the cylinder 28 of the conduit. The piston will, therefore, be caused to drive the fluid back and forth in the conduit through the valve 36 and since, as previously noted, the passage 37 of the valve is of a diameter corresponding to the internal diameter of the conduit, the flow of fluid within the conduit will, when the valve is open, be unrestricted. Thus, under normal circumstances, the presence of the brake upon the vehicle will offer a negligible resistance to the rotation of the propeller shaft. However, by rocking the foot pedal 40 forward, the lever 39 may be swung forwardly, as shown in dotted lines in Figure 2, for rotatably closing the valve and checking the flow in the conduit, when the fluid will offer a corresponding resistance to the movement of the piston 30 and exert a like braking effect upon the propeller shaft and consequently upon the movement of the vehicle. As will be seen, this braking effect will be increased as the closing movement of the valve is continued so that by manipulation of the valve, the movement of the vehicle may be easily and quickly controlled to a nicety.

Having thus described the invention, what is claimed as new is:

1. In a fluid brake for motor vehicles, an endless fluid conduit formed of detachably connected sections including a side section provided with a single integral elbow at one end thereof, a separate elbow connected to the opposite end of said section, a second side section extending between and secured to confronting ends of said elbows and forming a cylinder, a piston reciprocable in said cylinder, means for connecting the piston with a propeller shaft to be reciprocated thereby, and a valve interposed directly in said first mentioned side section of the conduit for checking the flow of fluid in the conduit.

2. In a fluid brake for motor vehicles, an endless fluid conduit and integrally connected plate unit for attachment to a vehicle chassis, said conduit embodying a cylinder, a piston reciprocable in said cylinder, a slidable cross head carried by said plate, a crank shaft journaled upon the plate, a connecting rod extending between the cross head and said shaft, means for connecting the crank shaft with a propeller shaft for rotating the crank shaft and reciprocating the piston, and a valve interposed in the conduit for checking the flow of fluid therein.

3. In a fluid brake for motor vehicles, an endless fluid conduit and integrally connected plate unit for attachment to a vehicle chassis, said conduit embodying a cylinder and said plate being formed with a crank case and with a gear case, covers for the crank case and gear case, a crank shaft journaled upon the plate to extend between the crank case and gear case, a piston reciprocable in said cylinder, a slidable cross head carried by said plate and housed by the cover of the crank case, gears housed by the gear case connecting the crank shaft with a propeller shaft for rotating the crank shaft and reciprocating the piston, and a valve interposed in the conduit for checking the flow of fluid therein.

4. A fluid brake for motor vehicles including an endless fluid conduit of uniform diameter comprising a plurality of pipe-like sections, one of said sections forming a cylinder, a piston reciprocable in said cylinder, means for connecting the piston with a propeller shaft to be driven thereby, and a valve interposed directly in the conduit for checking the flow of fluid therein.

5. A fluid brake for motor vehicles including an endless fluid conduit of uniform diameter comprising a plurality of pipe-like sections, one of said sections forming a cylinder, means detachably connecting said sections whereby said cylinder section may be removed without disturbing the other of said sections, a piston reciprocable in said cylinder, means for connecting the piston with a propeller shaft to be driven thereby, and a valve interposed directly in the conduit for checking the flow of fluid therein.

6. A fluid brake for motor vehicle including an endless fluid conduit of uniform diameter embodying a cylinder separable from the conduit, a piston reciprocable in said cylinder, means for connecting the piston with a propeller shaft to be driven thereby, and a rotary valve interposed directly in the conduit for checking the flow of fluid therein and provided with a passage therethrough of a diameter equal to the diameter of said conduit.

In testimony whereof I affix my signature.

ROBERT G. NELSON.